Sept. 28, 1971                    R. M. STANLEY                    3,608,226
            FISHHOOK SETTING MECHANISM FOR FISHING RODS
                          Filed June 24, 1969
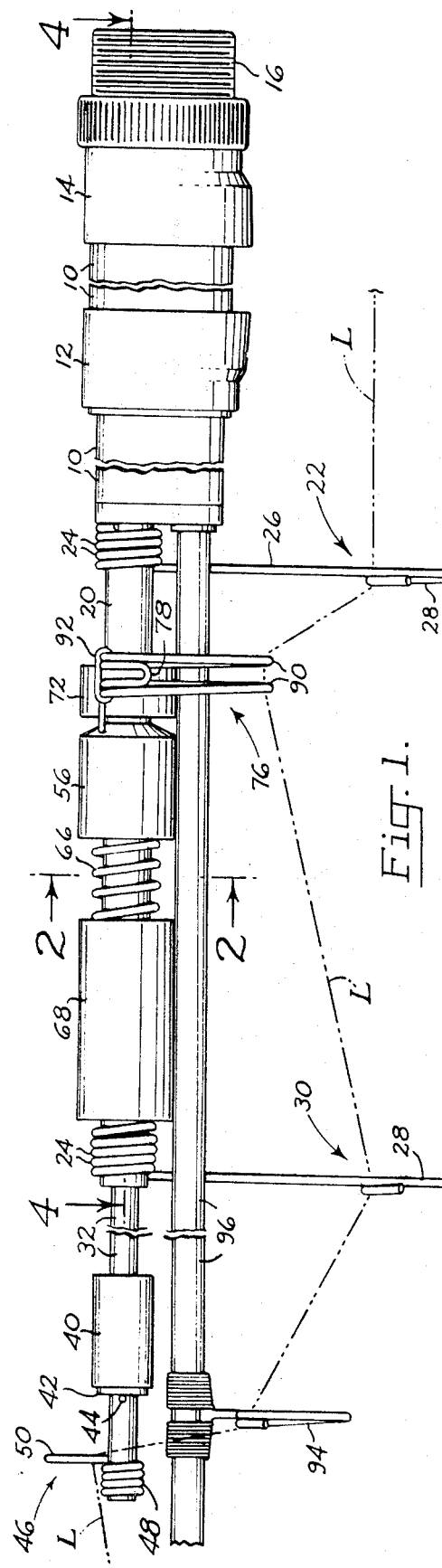
Russell M. Stanley
INVENTOR
BY
Oliver O. Olson
Agent United States Patent Office 3,608,226
Patented Sept. 28, 1971

3,608,226
FISHHOOK SETTING MECHANISM FOR FISHING RODS
Russell M. Stanley, Rte. 1, Box 576,
Lebanon, Oreg. 97355
Filed June 24, 1969, Ser. No. 836,028
Int. Cl. A01k 97/00
U.S. Cl. 43—15                                13 Claims

ABSTRACT OF THE DISCLOSURE

An elongated fishing line retractor rod is movable relative to a guide tube longitudinally forward, against the tension of a resilient retractor member, to a set position secured releasably by a lock interengaging a tube and a rod. In the set position a fishing line extends forward from a reel through a fixed eyelet, and then through a laterally offset and movable trigger eyelet, thence through at least one more fixed eyelet and around a retractor pin on the forward end of the retractor rod and thence through other fishing rod eyelets. When a fish pulls on the line, the portion thereof extending between the spaced fixed eyelets tends to straighten, moving the laterally offset trigger eyelet toward alignment with the fixed eyelets. The trigger eyelet thus release the lock and the retractor rod and pin is pulled resiliently rearward thereby pulling rearward on the fishing line sufficiently to set the hook in the fish.

BACKGROUND OF THE INVENTION

This invention relates to fishing rods, and more particularly to mechanism associated with a fishing rod for setting a fish hook automatically when the fish takes the hook.

Various types of devices have been provided heretofore for setting a fish hook automatically when it is taken by a fish. Some of these devices utilize the flexing of the fishing rod to trigger a rod or line-retracting mechanism. Because of the wide variation in flexibility of fishing rods, such line-retracting mechanisms either are operable only with rods of specified flexibility, or they include complex and costly adjusting mechanism to accommodate use with rods having varying flexibilities. Other devices utilize retractable line-clamping mechanism for positively engaging a fishing line to pull the latter rearward when released by fish-actuated trigger mechanism. Such devices prohibit or at least render difficult the manipulation of the fishing line during the process of fishing. Such devices also provide retraction of the fishing line with a jerking motion which oftentimes results in pulling the hook free of the fish, or in breaking the line.

SUMMARY OF THE INVENTION

In its basic concept this invention utilizes the pull exerted by a fish taking a hook on a fishing line to straighten a portion of the line extending between spaced, fixed line guides, the straightening of the line functioning to move a trigger to release a line-engaging retractor which thereupon pulls rearward on the line and sets the hook.

It is by virtue of the foregoing basic concept that the principal objective of this invention is achieved, namely to overcome the disadvantages of prior devices as enumerated hereinbefore.

Another object of this invention is the provision of mechanism of the class described which includes means for adjusting the resistance to release of the retractor, whereby to accommodate use of the mechanism to fishing for various types and sizes of fish and under varying conditions of water current.

A further object of this invention is the provision of mechanism of the class described which is of simplified construction for economical manufacture.

A still further object of this invention is the provision of a novel fishing line guide eyelet which functions with speed and facility to receive a fishing line therein without the necessity of threading the line through it.

The foregoing and other objects and advantages of this invention will appear from the following detailed description, taken in connection with the accompanying drawings of the preferred embodiment.

BRIEF DESCRIPTION OF THE DRAWINGS

FIG. 1 is a fragmentary, foreshortened view in side elevation of fishhook setting mechanism embodying the features of this invention.

FIG. 2 is a transverse section taken on the line 2—2 in FIG. 1.

FIG. 3 is a fragmentary plan view as viewed in the direction of the arrows 3—3 in FIG. 2.

FIG. 4 is a fragmentary, foreshortened longitudinal section taken along the line 4—4 in FIG. 1 and showing the retractor rod locked in extended position.

FIG. 5 is a fragmentary longitudinal section similar to FIG. 4 but showing the retractor rod released to retracted position.

DESCRIPTION OF THE PREFERRED EMBODIMENT

Referring particularly to FIG. 1, there is shown a fishing rod handle 10 provided at its rear end with a conventional fixed reel-mounting ferrule 12 and an associated movable ferrule 14 adjustable longitudinally by means of the threaded portion 16 of the handle. A longitudinal opening 18 through the handle receives and anchors therein the rearward portion of an elongated guide tube 20 which projects forwardly beyond the handle.

Secured to the tube adjacent the handle is a fishing line guide eyelet 22. Although any one of various conventional types of eyelets may be employed, the construction illustrated is preferred. This eyelet is made from a single length of wire formed at one end with a plurality of spiral turns 24, the inner diameter of which is slightly less than that of the tube. This inner mounting end is installed on the tube by pushing it onto the latter while simultaneously rotating it in the direction of the spiral. When thus installed the spiral turns firmly grip the tube to secure it in the desired fixed position.

An intermediate length 26 of the wire extends from the inner mounting portion 24 to the outer eyelet portion 28. This portion is formed in a spiral of slightly more than one turn of uniform diameter, the lapping end portion of the spiral preferably abutting the adjacent portion of the wire. This eyelet construction allows the fishing line to be installed in it simply by sliding the line under the intermediate portion 26 and between the lapping portions of the spiral in the direction toward the terminal end thereof. Removal of the line is effected by doubling back a portion of line ahead of the eyelet and repeating the foregoing procedure with the doubled back portion.

A similarly-constructed fishing-line guide eyelet 30 also is mounted in fixed position at the outer end of the tube 20. The eyelets 22 and 30 are aligned on a substantially common axis.

Mounted in the guide tube 20 for longitudinal sliding movement is an elongated retractor rod 32 which projects forwardly of the tube. Resilient means interengages the tube and rod to urge the latter rearward to a position of retraction. In the embodiment illustrated (FIG. 4) the resilient means comprises a length of rubber or other elastic tubing 34. The tubing is secured detachably at its forward end to the rearward end of the rod by such means as the band 36. The rearward end of the tubing is secured detachably to the rearward end of the guide tube, by such means as the ball 38 which enlarges the rearward end of the tubing to a diameter greater than the inner diameter of the guide tube.

The extent of rearward retraction of the rod is limited by the stop member 40, preferably made of rubber or other resilient material. The stop member is mounted adjacent the outer end of the rod and abuts the washer 42 which, in turn, abuts the transverse pin 44.

At the outer end of the rod is mounted a combination fishing line retractor and guide member 46. In the embodiment illustrated, this member comprises a length of wire bent at one end to form a plurality of spiral turns 48, the inner diameter of which is slightly less than that of the rod, to provide attachment thereof in the same manner as the mounting turns 24 previously described. The opposite end of the wire projects outwardly of the rod, in the form of a pin 50, for guiding and retracting fishing line, as explained hereinafter. The pin 50 may be replaced by a guide eyelet, such as eyelet 28, if desired.

Means is provided for locking the rod 32 in its forwardly extended position and for releasing the rod for movement to its retracted position. Thus, referring particularly to FIGS. 4 and 5 of the drawings, the guide tube 20 is provided with a plurality of circumferentially-spaced, radial opening 52, each of which contains a locking ball 54 for radial movement therein. A locking sleeve 56 is mounted slidably on the tube and overlies the openings. An annular inner groove 58 in the locking sleeve is movable into and out of registry with the openings and locking balls. The forward edge of the groove is defined by the angular cam surface 60. When in registry with the openings (FIG. 5) the locking balls may move radially outward into the groove. When out of registry with the openings, the locking balls are forced radially inward by the cam surface 60. In this position the locking balls enter an annular external groove 62 adjacent the rearward end of the rod 32 when the latter has been pulled forward to its position of extension. The locking balls thus secure the rod in said position of extension. The forward edge of the groove 62 is defined by the angular cam surface 64.

The locking sleeve 56 is urged resiliently to the position (FIG. 4) of non-registry of the annular groove 58 and openings 52. In the embodiment illustrated, this means comprises a coil spring 66 surrounding the tube and abutting at its rearward end against the forward end of the sleeve. The forward end of the spring abuts the rearward end of an adjustment sleeve 68 which is mounted for rotation on the guide tube 20. The forward portion of the adjustment sleeve bore is enlarged to receive therein the additional expanded spiral turns 24' provided on the inner mounting portion 24 of the eyelet member 30. A ball 70 is retained in a socket in the sleeve and straddles adjacent turns of the expanded spiral. Accordingly, as the adjustment sleeve 68 is rotated relative to the guide tube and spiral turns, it is moved longitudinally toward and away from the locking sleeve 56. This adjustment effects compression or extension of the coil spring 66 which thus increases or decreases the resilient force urging the locking sleeve to said position of non-registry of the groove 58 and openings 52. The extent of rearward movement of the locking sleeve is limited by abutment with the stop collar 72 secured adjustably to the guide tube by such means as the set screw 74.

Trigger means 76 is provided for moving the locking sleeve 56 forward, against the opposing force of the spring 66, to the release position illustrated in FIG. 5, in response to a pull on a fishing line by a fish as it takes a hook attached to the line. Referring particularly to FIG. 3 of the drawings, the trigger means illustrated is formed of a single length of wire which is bent intermediate its ends in a reverse bend 78, thereby providing a pair of laterally-spaced legs. The terminal ends 80 of the legs are bent inward toward each other for reception in aligned bearing sockets provided in the opposite faces of the stop collar 72. The leg facing the locking sleeve 56 is bent angularly toward said sleeve to form a cam surface 82 which slidably engages the adjacent, and preferably beveled, end surface 84 of the locking sleeve.

Outward of the cam portion 82 of the leg the latter is bent angularly inward toward the other leg, and then the remaining intermediate portions 86, 88 of the legs extend outward to the outer eyelet portion 90 which includes the closed reverse bend 78. This eyelet portion of the legs is bent to form a spiral loop of substantially uniform diameter and of slightly more than one turn. The portion of the legs adjacent the reverse bend 78 is disposed between the outer turns and preferably is in substantial abutment therewith. This construction provides a fishing line guide eyelet having the same advantage as the eyelets previously described, namely, of facilitating reception of a fishing line within the eyelet without the necessity of threading it through the latter. Thus, the fishing line is placed under the intermediate leg portions 86, 88 and then drawn outward toward the reverse bend 78. The fishing line thus is drawn outward through the spaces between the lapping portions of the turns and beyond the reverse bend, whereupon the line is captured within the eyelet.

An adjustable clip 92 is mounted slidably on the leg portions 86, 88 for releasably securing the inturned pivot ends 80 in the pivot bearing sockets of the stop collar 72. By sliding the clip member outward toward the eyelet 90, the inner ends may be sprung apart for removal from the pivot sockets.

Forwardly of the fixed eyelet 30 is still another fishing line guide eyelet 94 which also is fixed in relation to the guide tube 20. In the embodiment illustrated this eyelet is mounted on a length of fishing rod 96 which is secured removably at its rearward end in a socket provided in the forward end of the handle 10. The eyelet 94 also is positioned forwardly of the retracted position of the fishing line guide and retractor pin 46. In practice, referring to the arrangement illustrated in FIG. 1, the distance between the extended and retracted positions of the pin is about 10 inches, and the fixed eyelet 94 is positioned substantially adjacent the extended position of the pin. Accordingly, with a fishing line L extending forwardly from a reel through the eyelets and around the extended pin, as illustrated, movement of the rod 32 to its retracted position will cause the length of fishing line extending forwardly from the pin to be drawn rearward about 20 inches.

Although the rod 32 retracts with considerable force and speed, the fishing line may slip slightly because it is not gripped securely at any portion throughout its length from the reel to the hook. Thus, during retraction of the rod, with consequent rearward pulling of the fishing line, the reel may slip sufficiently to minimize the jerking effect at the hook, but still provide sufficient force on the latter to secure it firmly in the fish.

The operation of the mechanism described hereinbefore is as follows: The fishing line L is extended forwardly from the reel through the fixed eyelet 22, thence through the laterally offset trigger eyelet 90, through the fixed eyelets 30 and 94 aligned with the first named fixed eyelet 22, and thence forward through additional eyelets on the fishing rod. The retracor rod 32 now is pulled forward to its position of extension where it is locked by virtue of the locking ball 54 having been forced radially inward into the annular groove 62 adjacent the rearward end of the rod, by rearward movement of the locking sleeve 56. The fishing line just ahead of eyelet 94 then is picked up with the fingers and laid over the guide and retractor pin 50.

When a fish takes the hook and pulls outward on the fishing line, the length of line extending between the fixed eyelets 22 and 30 tends to straighten. In so doing, it pulls the movable trigger eyelet 90 toward axial alignment with the fixed eyelets, thereby pivoting the trigger member about the axis of its pivot ends 80. As the trigger member pivots in this manner, the cam portion 82 slides arcuately along the engaging surface 84 of the locking sleeve 56 and forces the latter forward against the resistance of the spring 66, until the annular groove 58 in the locking sleeve registers with the openings 52 containing the locking balls 54. The locking balls thus are forced radially outward into the annular groove 58, by the angular cam surface 64 of the retractor rod groove 62. The rod 32 thus is released from its locked position of extension, whereupon it is pulled forcefully by the resilient tubing 34 to its position of retraction defined by abutment of the stop member 40 against the forward end of the guide tube 20. The fishing line thus is pulled rearward sufficiently to set the hook firmly in the fish.

It will be apparent to those skilled in the art that various changes may be made in the size, shape, number, type and arrangement of parts described hereinbefore. For example, the guide tube 20 and supported structure may be clamped or otherwise secured to a conventional fishing rod as a self-contained attachment. The elongated resilient tubing 34 may be replaced with a coil spring. A fixed sleeve may replace the adjustable sleeve 68 illustrated, although the latter is preferred for the obvious advantage of affording adjustment of sensitivity of the triggering mechanism. The foregoing and other changes may be made, as desired, without departing from the spirit of this invention.

Having now described my invention and the manner in which it may be used, I claim:

1. Fishhook setting mechanism for a fishing rod, comprising
   (a) an elongated guide tube,
   (b) first and second longitudinally spaced, substantially aligned fishing line guide means fixed relative to the tube for slidably engaging a fishing line,
   (c) trigger means mounted on the tube between the first and second guide means and including third fishing line guide means for slidably engaging a fishing line, the third fishing line guide means being movable transversely relative to the first and second guide means,
   (d) an elongated retractor rod slidable in the tube between extended and retracted positions,
   (e) fishing line guide and retractor means on the forward end of the rod for slidably engaging a fishing line forward of the front one of the fixed line guide means,
   (f) the fishing line guide and retractor means being positioned adjacent the front one of the fixed line guide means in the extended position of the retractor rod and rearward of said front one of the fixed line guide means in the retracted position of the retractor rod,
   (g) resilient means interengaging the tube and rod urging the latter toward said retracted position, and
   (h) lock means interengaging the tube and rod for securing the latter releasably in said extended position,
   (i) the trigger means engaging the lock means during movement of the third line guide means toward the axis of the first and second line guide means to release the rod for retraction.

2. The fishhook setting mechanism of claim 1 including reel mounting base means supporting the rearward end of the tube.

3. The fishhook setting mechanism of claim 2 including a fishing rod member supported by the base means and mounting the fourth guide means.

4. The fishhook setting mechanism of claim 1 wherein the resilient means comprises an elongated resilient member interengaging the rearward ends of the tube and rod.

5. The fishhook setting mechanism of claim 1 including adjustable resilient means interengaging the tube and lock means for adjusting the resistance to movement of the lock means by the trigger means.

6. The fishhook setting mechanism of claim 1 wherein the trigger means comprises:
   (a) a mounting sleeve on the tube, and
   (b) a cam member mounted pivotally on the mounting sleeve adjacent the rod means on an axis substantially parallel to the tube,
   (c) the cam member being engageable with the lock means during said pivotal movement to move the lock means to release position.

7. The fishhook setting mechanism of claim 1 wherein the lock means comprises
   (a) a locking sleeve slidable on the tube,
   (b) a plurality of circumferentially spaced openings through the tube,
   (c) a locking ball in each opening movable axially therethrough,
   (d) an annular recess in the retractor rod arranged to receive the locking balls in the extended position of the rod, and
   (e) an annular recess in the locking sleeve arranged to receive the locking balls in the release position of the sleeve,
   (f) the trigger means engaging the locking sleeve during movement of the third guide means toward the axis of the first and second guide means to release the rod for retraction.

8. The fishhook setting mechanism of claim 7 wherein the trigger means comprises
   (a) a mounting sleeve on the tube, and
   (b) a cam member mounted pivotally on the mounting sleeve adjacent the lock means on an axis substantially parallel to the tube,
   (c) the cam member being engageable with the locking sleeve during said pivotal movement to move the lock means to release position.

9. Th fishhook setting mechanism of claim 8 including adjustable resilient means interengaging tube and locking sleeve for adjusting the resistance to movement of the locking sleeve by the cam member.

10. Fishhook setting mechanism for a fishing rod, comprising
    (a) an elongated guide tube,
    (b) an elongated retractor rod slidable in the tube between extended and retracted positions,
    (c) fishing line guide and retractor means on the forward end of the rod,
    (d) resilient means interengaging the tube and rod urging the latter toward said retracted position,
    (e) lock means interengaging the tube and rod for securing the latter releasably in said extended position,
    (f) first and second longitudinally spaced, substantially aligned fishing line guide means fixed relative to the tube,
    (g) trigger means mounted on the tube between the first and second guide means and including third fishing line guide means movable transversely relative to the first and second guide means,
    (h) the trigger means engaging the lock means during movement of the third guide means toward the axis of the first and second guide means to release the rod for retraction,
    (i) fourth fishing line guide means fixed relative to the tube forward of the retracted position of the guide and retractor means, and
    (j) adjustable resilient means interengaging the tube and lock means for adjusting the resistance to movement of the lock means by the trigger means.

11. Fishhook setting mechanism for a fishing rod, comprising
    (a) an elongated guide tube,
    (b) an elongated retractor rod slidable in the tube between extended and retracted positions,
    (c) fishing line guide and retractor means on the forward end of the rod,
    (d) resilient means interengaging the tube and rod urging the latter toward said retracted position,
    (e) lock means interengaging the tube and rod for securing the latter releasably in said extended position, the lock means comprising
   (1) a locking sleeve slidable on the tube,
   (2) a plurality of circumferentially spaced openings through the tube,
   (3) a locking ball in each opening movable axially therethrough,
   (4) an annular recess in the retractor rod arranged to receive the locking balls in the extended position of the rod, and
   (5) an annular recess in the locking sleeve arranged to receive the locking balls in the release position of the sleeve,
(f) first and second longitudinally spaced, substantially aligned fishing line guide means fixed relative to the tube,
(g) trigger means mounted on the tube between the first and second guide means and including third fishing line guide means movable transversely relative to the first and second guide means,
(h) the trigger means engaging the locking sleeve during movement of the third guide means toward the axis of the first and second guide means to release the rod for retraction, and
(i) fourth fishing line guide means fixed relative to the tube forward of the retracted position of the guide and retractor means.

12. The fishhook setting mechanism of claim 11 wherein the trigger means comprises (a) a mounting sleeve on the tube, and
(b) a cam member mounted pivotally on the mounting sleeve adjacent the lock means on an axis substantially parallel to the tube,
(c) the cam member being engageable with the locking sleeve during said pivotal movement to move the lock means to release position.

13. The fishhook setting mechanism of claim 12 including adjustable resilient means interengaging tube and locking sleeve for adjusting the resistance to movement of the locking sleeve by the cam member.

References Cited

UNITED STATES PATENTS

| | | | |
|---|---|---|---|
| 396,707 | 1/1889 | Parker | 43—24 |
| 703,996 | 7/1902 | Cattley | 43—24 |
| 754,094 | 3/1904 | Roth | 43—24 |
| 2,657,493 | 11/1953 | Coles | 43—16 |

FOREIGN PATENTS 805,414   12/1958   Great Britain.

SAMUEL KOREN, Primary Examiner

D. J. LEACH, Assistant Examiner

U.S. Cl. X.R.

43—24